(12) United States Patent
Jester

(10) Patent No.: US 11,807,151 B2
(45) Date of Patent: Nov. 7, 2023

(54) VEHICLE CONFIGURED TO ASSIST WITH CRANE RELOCATION

(71) Applicant: James Larry Jester, Whitewright, TX (US)

(72) Inventor: James Larry Jester, Whitewright, TX (US)

( * ) Notice: Subject to any disclaimer, the term of this patent is extended or adjusted under 35 U.S.C. 154(b) by 1130 days.

(21) Appl. No.: 16/520,601

(22) Filed: Jul. 24, 2019

(65) Prior Publication Data

US 2021/0023977 A1   Jan. 28, 2021

(51) Int. Cl.
  *B60P 3/28*   (2006.01)
  *B66C 23/36*  (2006.01)
  *B66C 23/00*  (2006.01)

(52) U.S. Cl.
  CPC ............... *B60P 3/28* (2013.01); *B66C 23/36* (2013.01); *B66C 23/54* (2013.01)

(58) Field of Classification Search
  CPC .... B66F 11/04; B66F 9/0622; B66F 9/07586; B66F 9/07513; B66F 9/07559; B66F 11/044; B66F 17/006; E02F 9/02; E02F 9/2257; B60P 3/28; B66C 23/36; B66C 23/54; B66C 23/62
  See application file for complete search history.

(56) References Cited

U.S. PATENT DOCUMENTS

| | | | |
|---|---|---|---|
| 4,242,036 A | 12/1980 | Slaght | |
| 4,660,731 A | 4/1987 | Becker | |
| 4,736,633 A * | 4/1988 | Duppong | B66C 23/54 73/837 |
| 2017/0291805 A1 * | 10/2017 | Hao | E02F 9/02 |
| 2021/0023977 A1 * | 1/2021 | Jester | B66C 23/36 |
| 2022/0204332 A1 * | 6/2022 | Miller | B66F 9/07559 |

FOREIGN PATENT DOCUMENTS

| | | | | |
|---|---|---|---|---|
| BR | 102014018542 A2 * | 11/2015 | ........... | A01D 34/008 |
| CA | 2209399 A1 * | 12/1988 | | |
| CA | 2282032 A1 * | 8/2000 | ........... | B66F 11/046 |
| CN | 108263971 B * | 8/2019 | ........... | B66C 13/20 |
| CN | 111943060 A * | 11/2020 | ........... | B66C 13/06 |
| CN | 108285092 B * | 12/2020 | ........... | B62D 11/003 |
| DE | 2227406 B2 | 12/1973 | | |
| DE | 102017209695 A1 * | 12/2018 | ........... | B66F 17/006 |
| EP | 1038823 A2 * | 9/2000 | ........... | B66F 11/046 |
| EP | 3875423 A1 * | 9/2021 | | |
| JP | 2018087059 A * | 6/2018 | | |
| WO | WO-2017140916 A1 * | 8/2017 | | |

OTHER PUBLICATIONS

Yamauchi et al. JP 2018-87059 English Machine translation, ip.com (Year: 2018).*

(Continued)

*Primary Examiner* — Karen Beck
(74) *Attorney, Agent, or Firm* — Lee & Hayes, P.C.

(57) ABSTRACT

A vehicle may be configured with an adjustable horizontal planar platform for receiving a load, such as a boom arm of a crane and transporting the load to a new location. In some cases, the platform is configured to swivel and tilt in order to maintain an alignment with a second vehicle during transport of a load.

20 Claims, 17 Drawing Sheets

(56) References Cited

OTHER PUBLICATIONS

T. Ritzenhofer, WO 2017/140916 English Machine translation, ip.com (Year: 2017).*
I. Ishikawa, JP 2013 142037 English Machine Translation, ip.com (Year: 2013).*
Wang et al. CN 109235514 English Machine Translation, ip.com (Year: 2019).*
N. Jorgensen EP 3214034 English Machine Translation, ip.com (Year: 2017).*
Office Action for U.S. Appl. No. 18/201,794, dated Aug. 9, 2023, James Larry Jester, "Vehicle Configured to Assist With Crane Relocation", 8 pages.

* cited by examiner

VEHICLE CONFIGURED TO ASSIST WITH CRANE RELOCATION

BACKGROUND

Today cranes are utilized in various settings, such as construction and vehicle loading, to both raise and lower materials as well as to move materials horizontally within a site. When needed at a particular site, a crane is transported in pieces or parts to the desired location and then assembled prior to use. However, once the boom arm is assembled and the cabling and counterweights are secured, movement of the crane becomes difficult to impossible. Even in situations involving a mobile crane being relocated at the particular site, the crane must often be disassembled prior to moving, as the height of the boom arm would cause the crane to impact electrical liens and cables. Unfortunately, the process of disassembling and reassembling a crane often take days and up to a week, which often delays construction time and increases overall operating cost.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
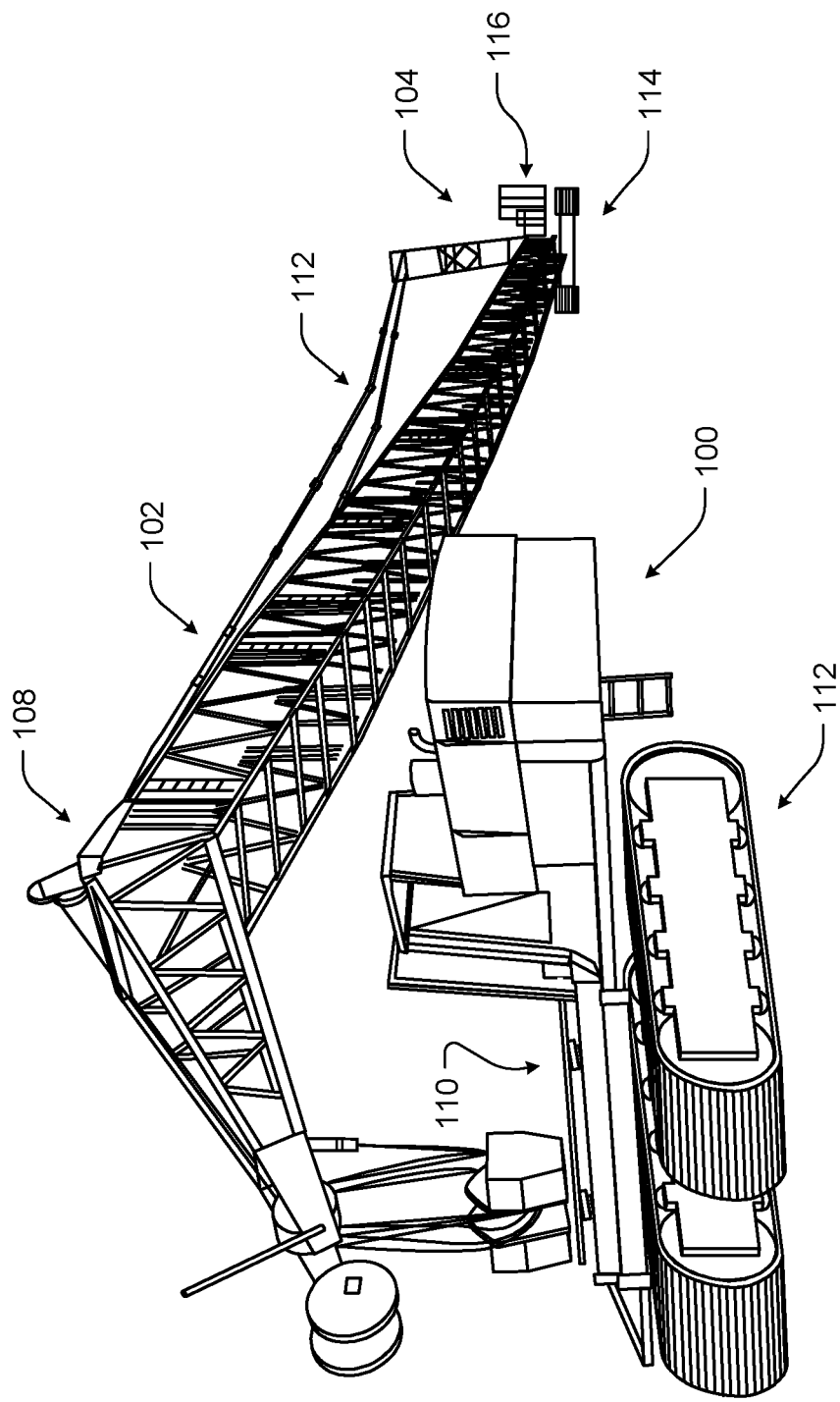
FIG. 1 illustrates an example vehicle in the process of receiving a boom arm of a crane for transport according to some implementations.

This disclosure includes systems, techniques, and implementations for relocation of a crane within a site without disassembling the boom arm of the crane or with only partial disassembling of the boom arm of the crane. For instance, even in short distance moves, if a crane needs to be moved under or past electrical lines, overpasses, or other obstructions, the crane is typically disassembled, the parts moved, and then reassembled at the new location. However, the process of disassembling and reassembling the crane often takes three to five days causing increased expense and potential delays to the pending project. Described, herein, is a vehicle and system for supporting and stabilizing a boom arm still attached to a crane during a move or relocation. In some implantations, a skid based steering vehicle may include a platform arranged over the treads to receive and support the boom arm of a crane when lowered into a horizontal position. For example, the cabling of the boom arm may be loosened or released to allow the boom arm of the crane to lower from a substantially vertical position to a substantially horizontal position. As the boom arm is lowered and the vehicle is driven or moved into a position directly below the top portion of the boom arm.

Once the boom arm is supported by the vehicle, the vehicle may move in conjunction with the cab of the crane to the new location. At the new location, the cabling may be reattached or tightened and the boom arm may be raised back to the substantially vertical position and the project may continue. By utilizing the vehicle with respect to the relocation of the crane 1-4 days may be saved, thereby reducing operating costs and minimizing any potential delays.

In some cases, the platform may be configured to maintain a constant height or elevation during the relocation process. For example, the platform may be supported by two or more lift systems, such as a hydraulic lift system. In this manner, the platform may be raised if the elevation of the land is lower at the location of the vehicle then at the cab of the crane. Alternatively, the platform may be lowered if the elevation of the land is higher at the location of the vehicle then at the cab of the crane. Thus, the vehicle is able to maintain the substantially horizontal position of the boom arm with respect to the crane to prevent any potential damage to the boom arm while moving. Similarly, the platform may be configured to tilt from right to left, in some cases, by the lift system. For example, a hydraulic cylinder may be coupled to the right and left side of the platform to allow the platform to tilt (or pitch) during transportation of the boom arm and, thereby, maintain a desired angle with respect to the cab of the crane.

In some examples, the platform may also be able to tilt from front to back in addition to or in lieu of from left to right. In these examples, additional lift system may be coupled between the platform and a base of the vehicle to allow the platform to pitch and roll or tilt forward, backward, left, and/or right with respect to the base of the vehicle and maintain the substantially horizontal position with respect to the cab of the crane.

In some implementations, the platform for receiving the boom arm may be positioned directly over the treads of the vehicle. In this manner, the vehicle may more readily balance and support the load. In this implementation, the cab of the vehicle may be positioned outward from or extended from the treads, such that some portion or all of the cab may be past the edge of the treads in one or more position of the cab. For example, the cab and/or platform may be positioned to rotate with respect to the base of the vehicle. For instance, the by allowing the cab and/or platform to rotate with respect to the base, the vehicle may more easily align with and receive the boom arm as well as provide more adaptable sightlines for the vehicle operator while transporting the crane.

In some instances, the vehicle may also be equipped with sensors, such as inertial measurement unit (IMU), accelerometers, gyroscopes, magnetometers, barometric pressure sensors, and/or other sensors that may provide orientation data usable to determine the angles, the angular rates, and the acceleration of the vehicle and/or the platform. The vehicle may also be equipped with one or more positioning units (such as a Global Positioning System (GPS)) to provide location data with respect to the vehicle. In these instances, the vehicle may be configured with a control system that may receive the orientation data and/or the location data to automictically adjust the height, pitch, roll, and/or yaw of the platform to maintain a desired position of the boom arm with respect to the cab. In some cases, the desired position may be maintained within one or more height thresholds, one or more angular thresholds, and/or one or more tolerance thresholds. The thresholds may be based at least in part on a size, height, and/or material of the boom arm and/or crane itself.

In some implementations, the sensors and positioning units may also be configured to collect data associated with the cab of the crane and/or the boom arm. The control system may also utilize the data associated with the cab of the crane and/or the boom arm when adjusting the position and height of the platform. In one specific example, the control unit may be in wireless communication with one or more sensor package that may be affixed or placed on the cab of the crane and/or on the boom arm to provide the data associated with the cab of the crane and/or the boom arm.

In one example, the vehicle may be configured as a passive system. In this example, when the boom arm of the crane is resting or positioned on the platform, the boom arm may be attached or secured to the vehicle. The vehicle may then act as a support that is pulled or capable of being moved together with and by the crane, as the crane is driven to the new position. In this implementation, the vehicle does not require a second operator to steer the vehicle in addition to the operator in the cab of the crane. Thus, the vehicle may operate in a manner similar to a trailer.

FIG. 1 illustrates an example vehicle 100 in the process of receiving a boom arm 102 of a crane 104 for transport according to some implementations. In the current example, the vehicle 100 may be positioned such that as the cabling 106 of the crane 104 is loosened or released, the top end 108 of the boom arm 102 contacts and is supported by a platform 110 of the vehicle 100. Thus, when the boom arm 102 of the crane 104 is in a horizontal position, the top portion of the boom arm 102 is supported off the ground by the vehicle 100.

In this example, the vehicle 100 includes a propulsion system that includes a tread based steering system 112. The crane 104 also includes a propulsion system 114, such that the vehicle 100 may move in conjunction with the crane 104 (e.g., the boom arm 102 is supported off the ground between the vehicle 104 and the base portion or cab portion 116 of the crane) over the terrain to a new location. In this example, since the boom arm 102 is in on horizontal position, the boom arm 102 may pass under various obstructions, such as power lines, overpasses, etc. Further, since the boom arm 102 is supported by the platform 110 of the vehicle 100, the boom arm 102 does not need to be disassembled and therefore, unlike, traditional methods of relocating a crane 104, the crane 104 may be moved in relatively small period of time. At the new location the cabling 106 may be tightened or reattached to cause the boom arm 102 to again be raised to allow the crane 104 to continue normal operations.

Figure 2:
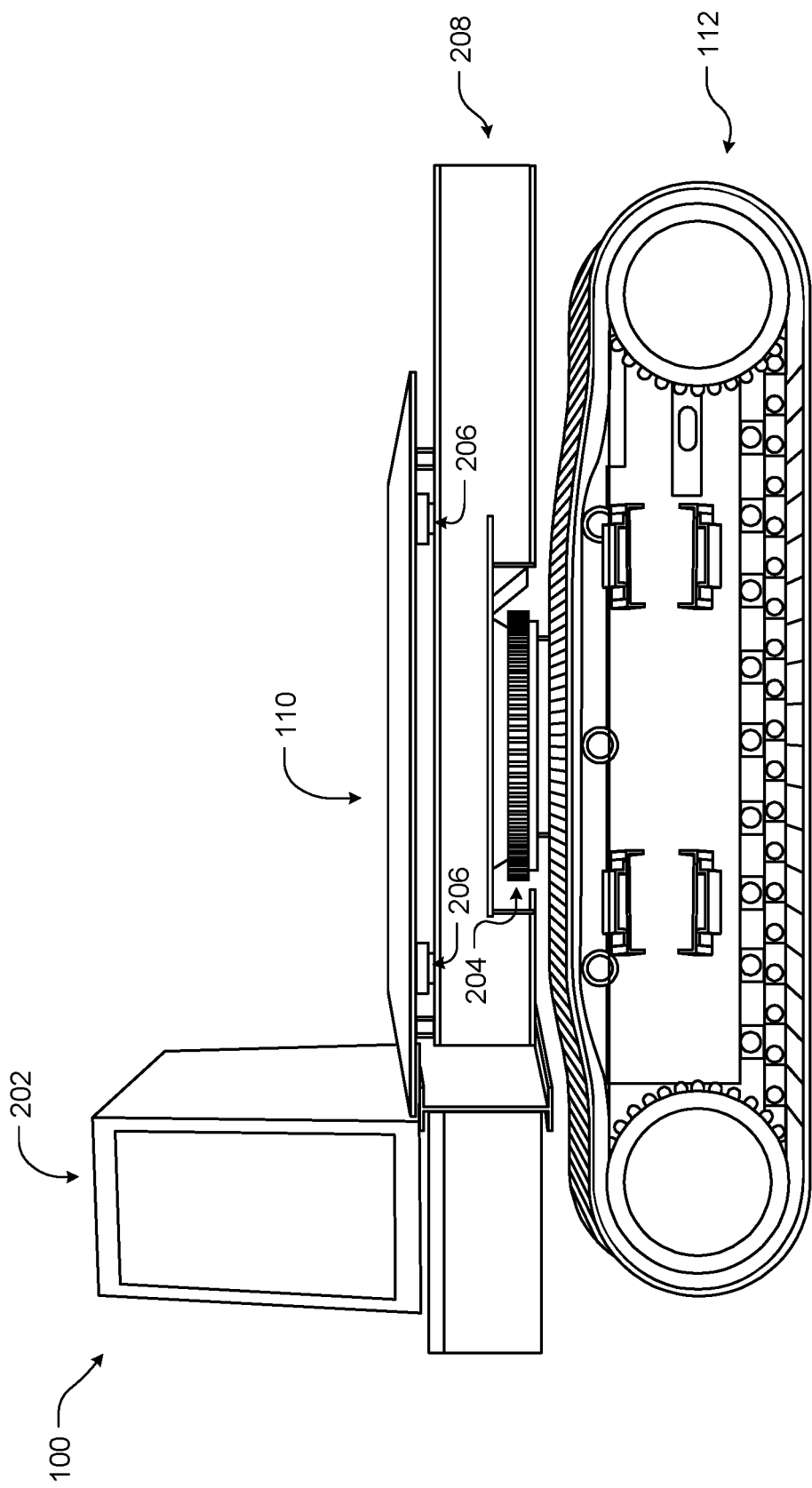
FIG. 2 illustrates an example side view of the vehicle of FIG. 1 with the platform in a horizontal position according to some implementations.
Figure 3:
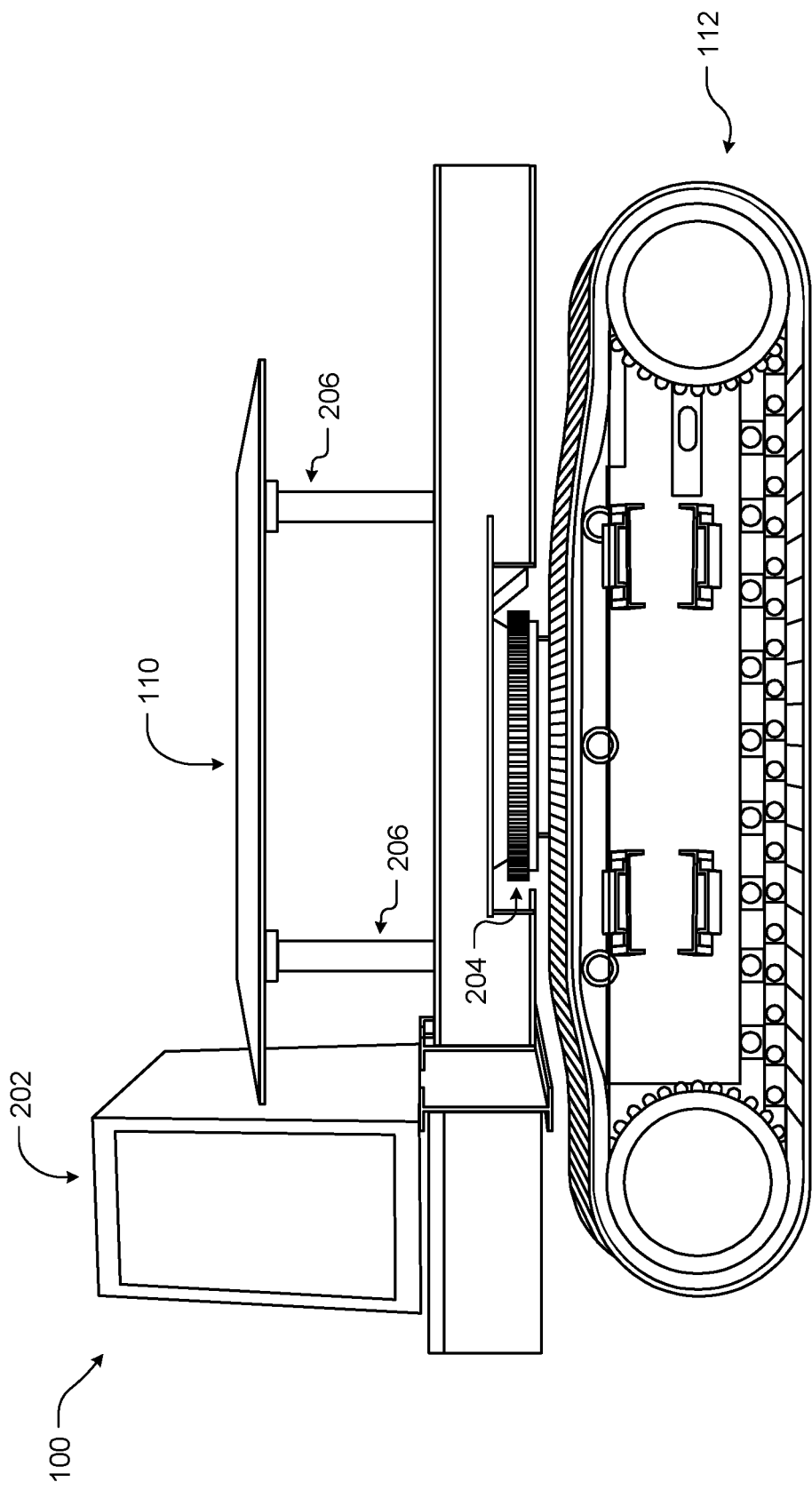
FIG. 3 illustrates an example side view of the vehicle of FIG. 1 with the platform in a raised position according to some implementations.
Figure 4:
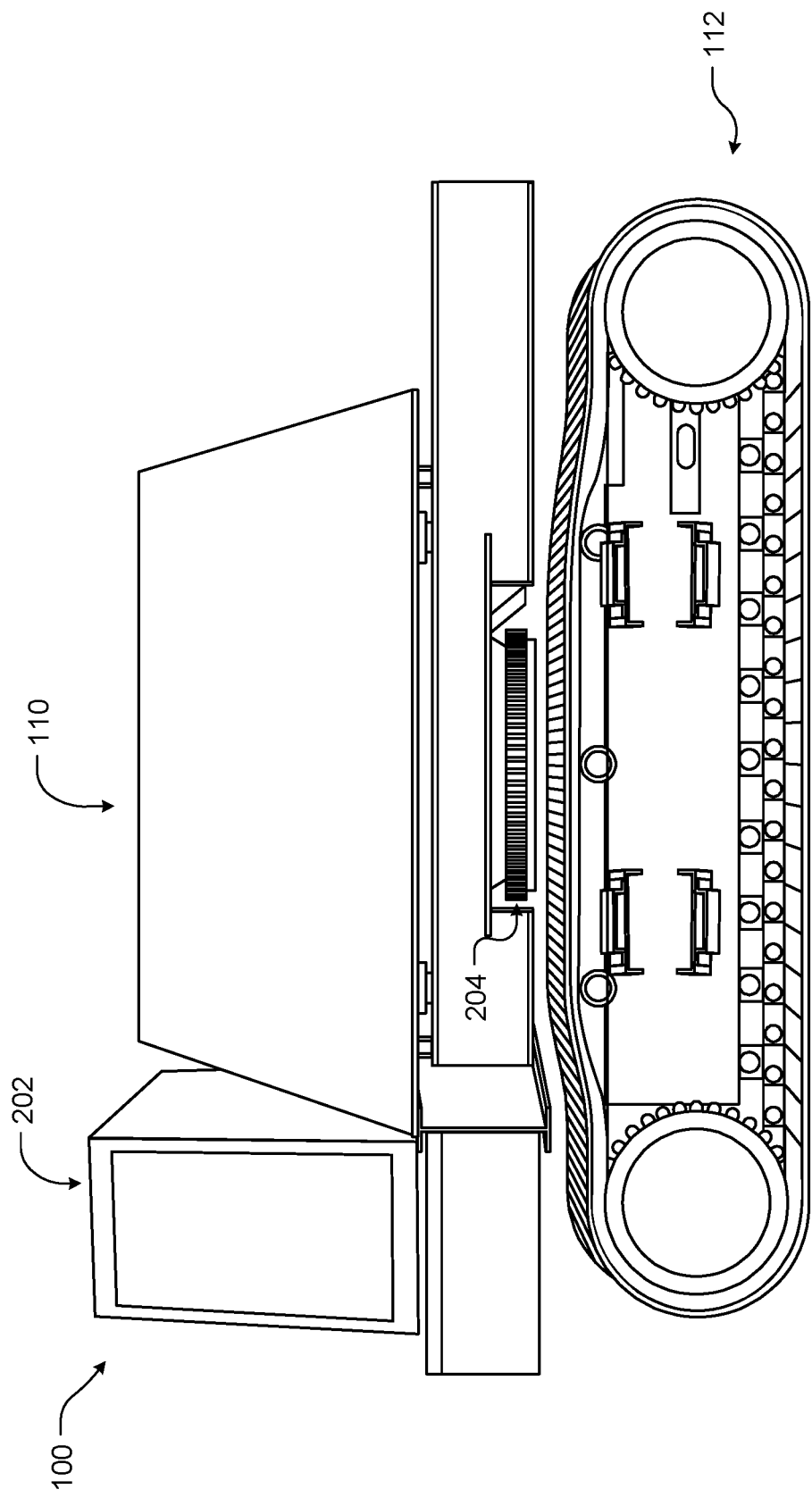
FIG. 4 illustrates an example side view of the vehicle of FIG. 1 with the platform in a tilted position according to some implementations.

FIGS. 2-4 illustrate example side views of the vehicle 100 of FIG. 1 according to some implementations. In the current example, the platform 110 of the vehicle 100 is positioned in a flat or horizontal position prior to receiving a boom arm of a crane (not shown). As illustrated, the platform 110 is positioned directly over the treads 112 of the vehicle 100 to assist with supporting a load, such as a boom arm of a crane. For instance, the vehicle 100 and platform 110 may be configured to support loads in the range of 50,000 to 250,000 pounds. In another example, the vehicle 100 and platform 110 may be configured to support loads in the range of 100,000 to 200,000 pounds. In yet another example, the vehicle 100 and platform 110 may be configured to support loads in the range of 50,000 to 150,000 pounds.

In some cases, such as the illustrated example, the vehicle 100 includes a cab or control unit 202 positioned adjacent to the platform 110. In some cases, the cab 202 may be coupled to the platform 110 via a base member 208, such that the cab 202, platform 110, and base member 208 may rotate together about a point, such as a central point of the platform (not shown). By positioning the cab 202 adjacent to the platform 110 and allowing the platform 110 and cab 202 to rotate together, the operator has increased flexibility with respect to viewing angles and position both when driving the vehicle 100 and receiving a load (e.g., a boom arm of a came). In the current example, the cab 202 and the platform 110 may rotate via a swing bearing 204 coupling wheel system or the treads 112 to base member 208 and, thus, to the cab 202 and the platform 110. In the current example, the base member 208 may be an I-beam configuration but it should be understood that other types of configurations may be used.

In addition to being able to rotate 360 degrees around the center of the platform 110 via the swing bearing 204, the platform 110 may be configured to tilt from side to side (e.g., left to right from the perspective of the cab 202). For example, the vehicle 100 may include one or more hydraulic cylinders, generally indicated by 206, that allow the platform 110 not only to tilt from side to side but also to be raised and lowered with respect to the treads 112. In some situations, the terrain between the cab or base of the crane and the vehicle 100 may be uneven. In these cases, the platform 110 may be lowered or raised by the operator or, in response, to terrain or orientation data collected from one or more sensors (e.g., IMUs, gyroscopes, accelerometers, etc.) positioned in the vehicle 100, the boom arm, and/or the crane base to maintain the horizontal position of the boom arm between the vehicle 100 and the crane base within a desired threshold. In one specific example, the platform 110 may also pitch forward and backwards from the perspective of the cab 202 in addition to or in lieu of tilting from side to side.

Figure 5:
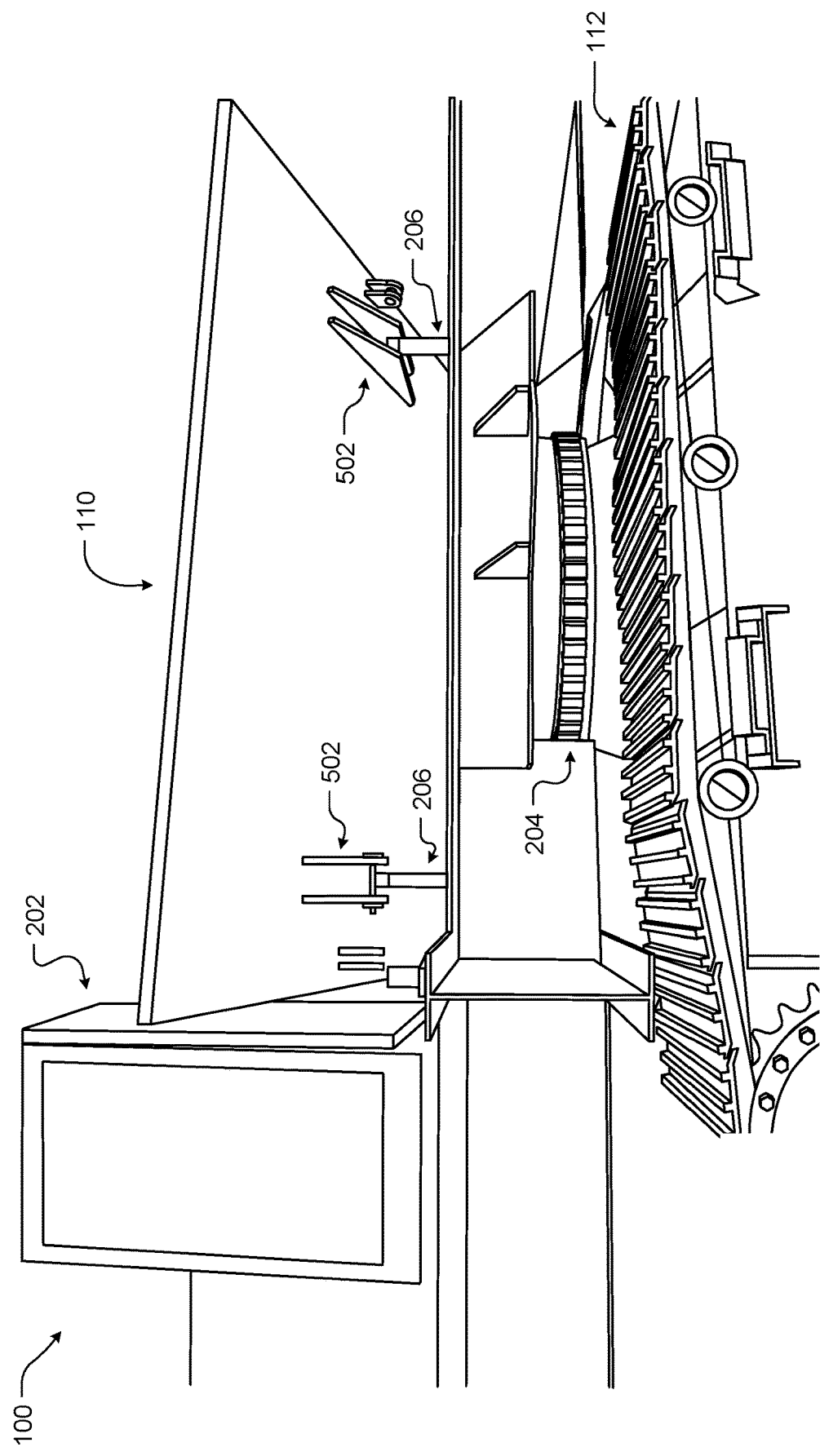
FIG. 5 illustrates an example zoomed in side views of bottom of the platform 110 in a tilted position according to some implementations.
Figure 6:
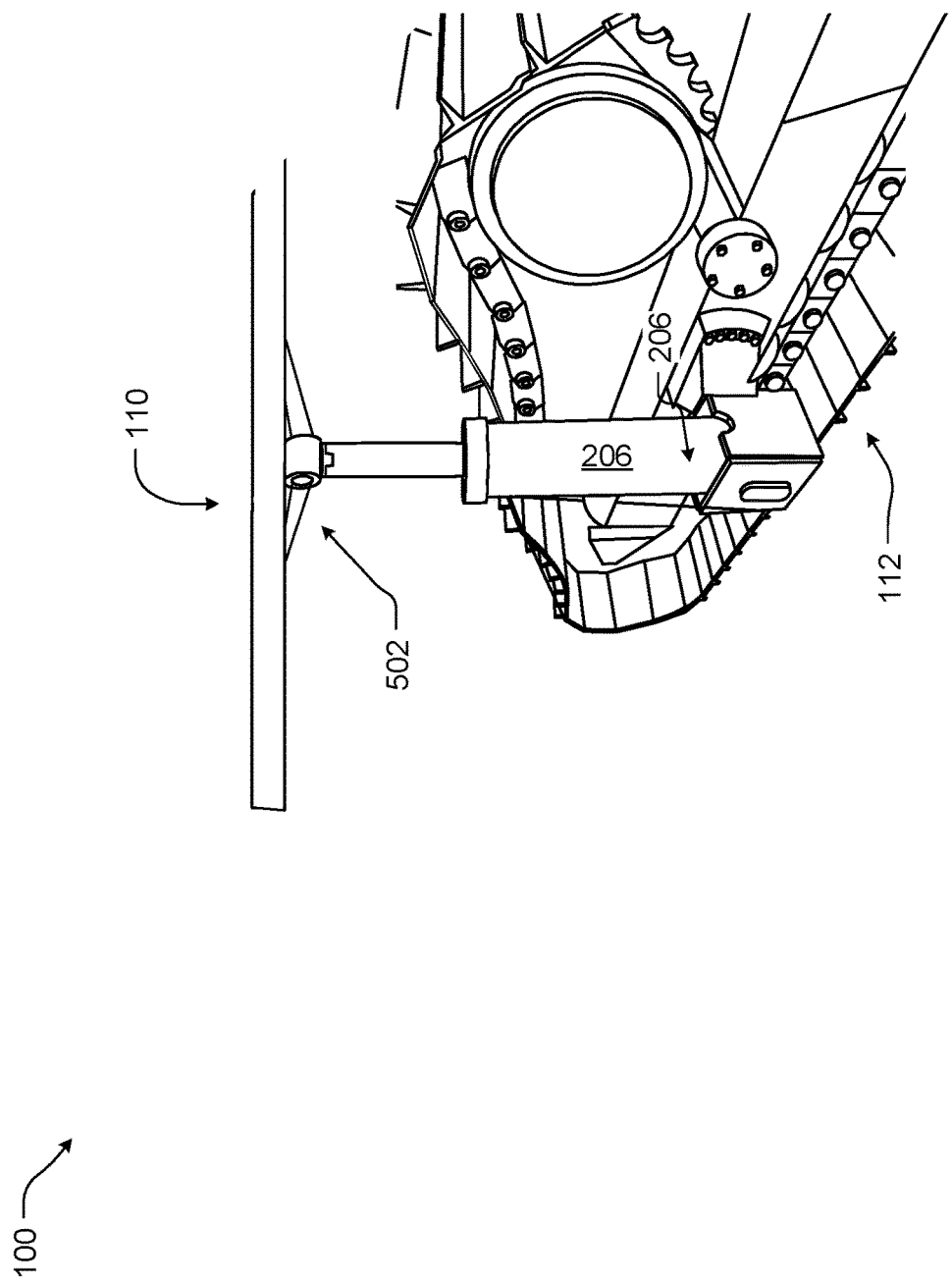
FIG. 6 illustrates another example zoomed in side views of bottom of the platform 110 in a horizontal position according to some implementations.

FIGS. 5 and 6 illustrates an example zoomed in side views of bottom of the platform 110 according to some implementations. As discussed above, the platform 110 may be configured to tilt from side to side (e.g., left to right from the perspective of the cab 202). In the current example, the tilt mechanism 502 is shown coupling the hydraulic cylinders 206 to the platform 110, such that the cylinder 206 allows the platform to raise and lower and the tilt mechanism 502 allows the platform 110 to tilt from side to side.

Figure 7:
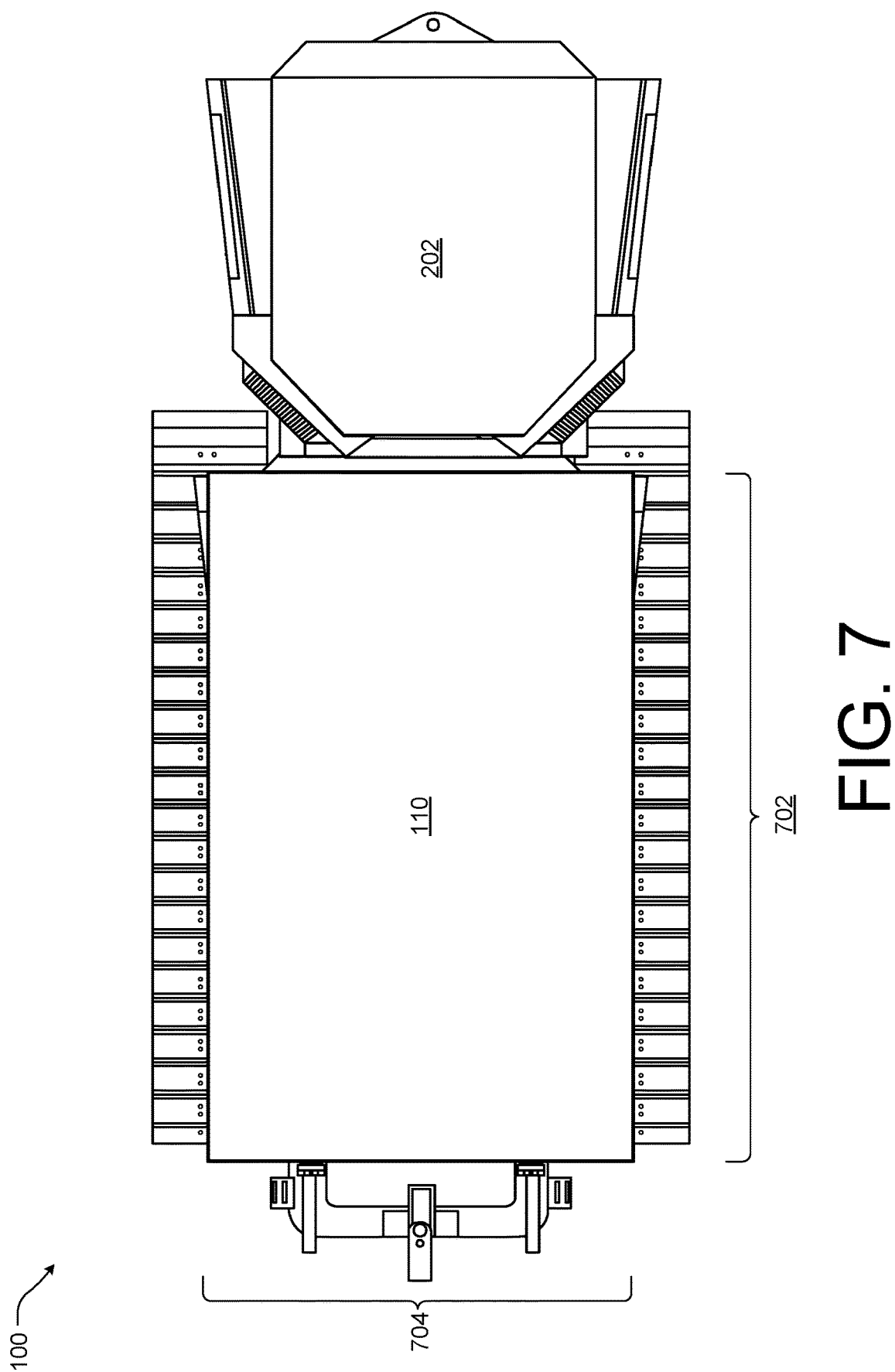
FIG. 7 illustrates an example top view of the vehicle according to some implementations.
Figure 8:
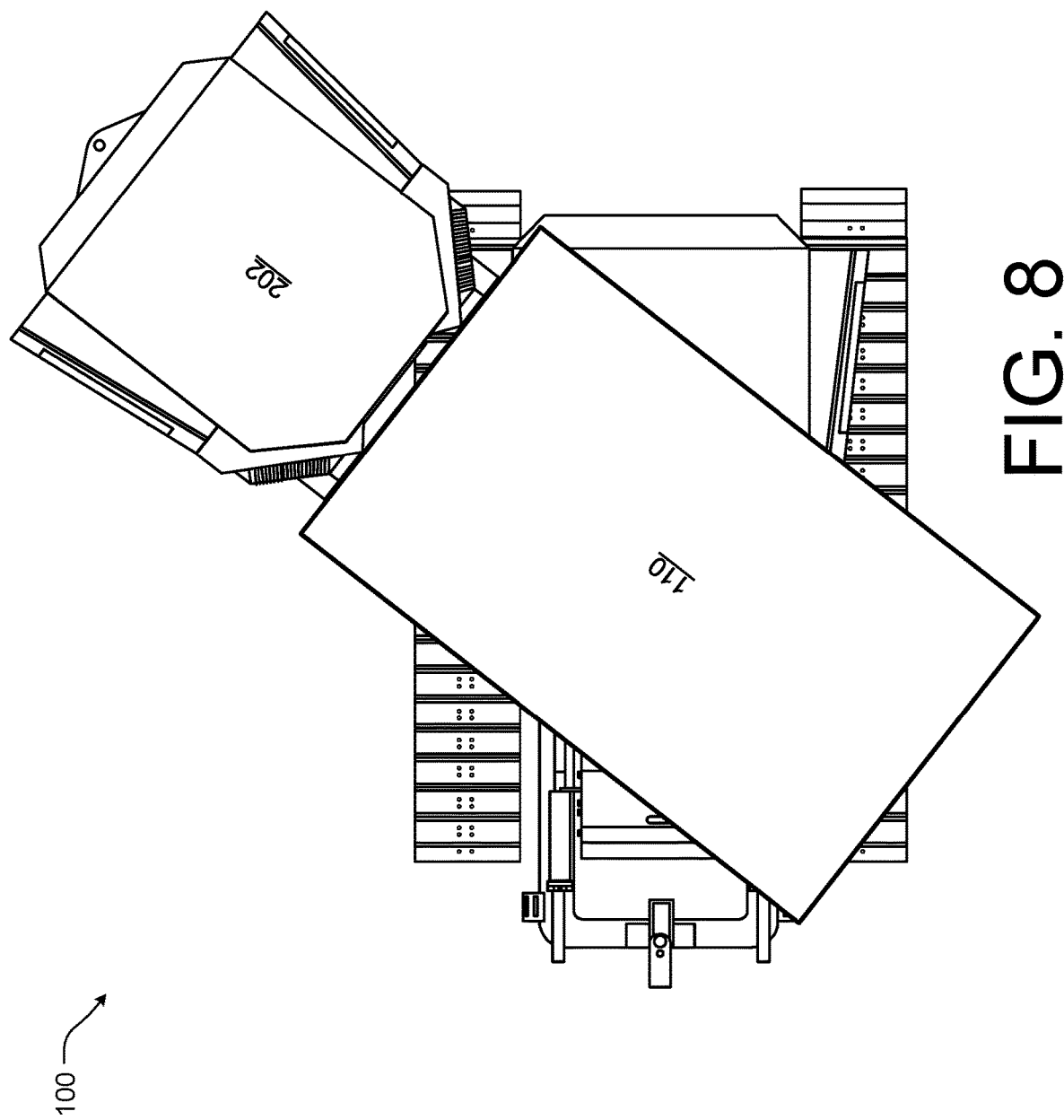
FIG. 8 illustrates an example top view of the vehicle according to some implementations.

FIGS. 7 and 8 illustrates example top views of the vehicle 100 according to some implementations. In the illustrated examples, the platform 110 and cab 202 of the vehicle 100 are aligned with the treads 112. However, as discussed above, the platform 110 and cab 202 may rotate about the treads 112. Thus, in FIG. 8 the platform 110 and cab 202 are shown rotated with respect to the treads 112. It should be understood that the platform 110 and cab 202 may rotate 360 degrees around the center axis, as discussed above. In some cases, the treads may be formed from steel or rubber.

In the current examples, the platform 110 may also a length 702 and a width 704. In some cases, the length 702 of the platform 110 may be between approximately 5 and 15 feet and the width 704 of the platform 110 may be between approximately 5 and 15 feet. In another example, the length 702 of the platform 110 may be between approximately 9 and 11 feet and the width 704 of the platform 110 may be between approximately 11 and 13 feet. In yet another example, the length 702 of the platform 110 may be approximately 12 feet and the width 704 of the platform 110 may be between approximately 12 feet. In still yet another example, the length 702 of the platform 110 may be approximately 10 feet and the width 704 of the platform 110 may be between approximately 12 feet. The platform may also have a thickness of between approximately 2.0 and 12 inches. In some cases, the thickness may be at least 4.0 inches to provide for proper support of a load of between approximately 50,000 and 150,000 pounds.

Figure 9:
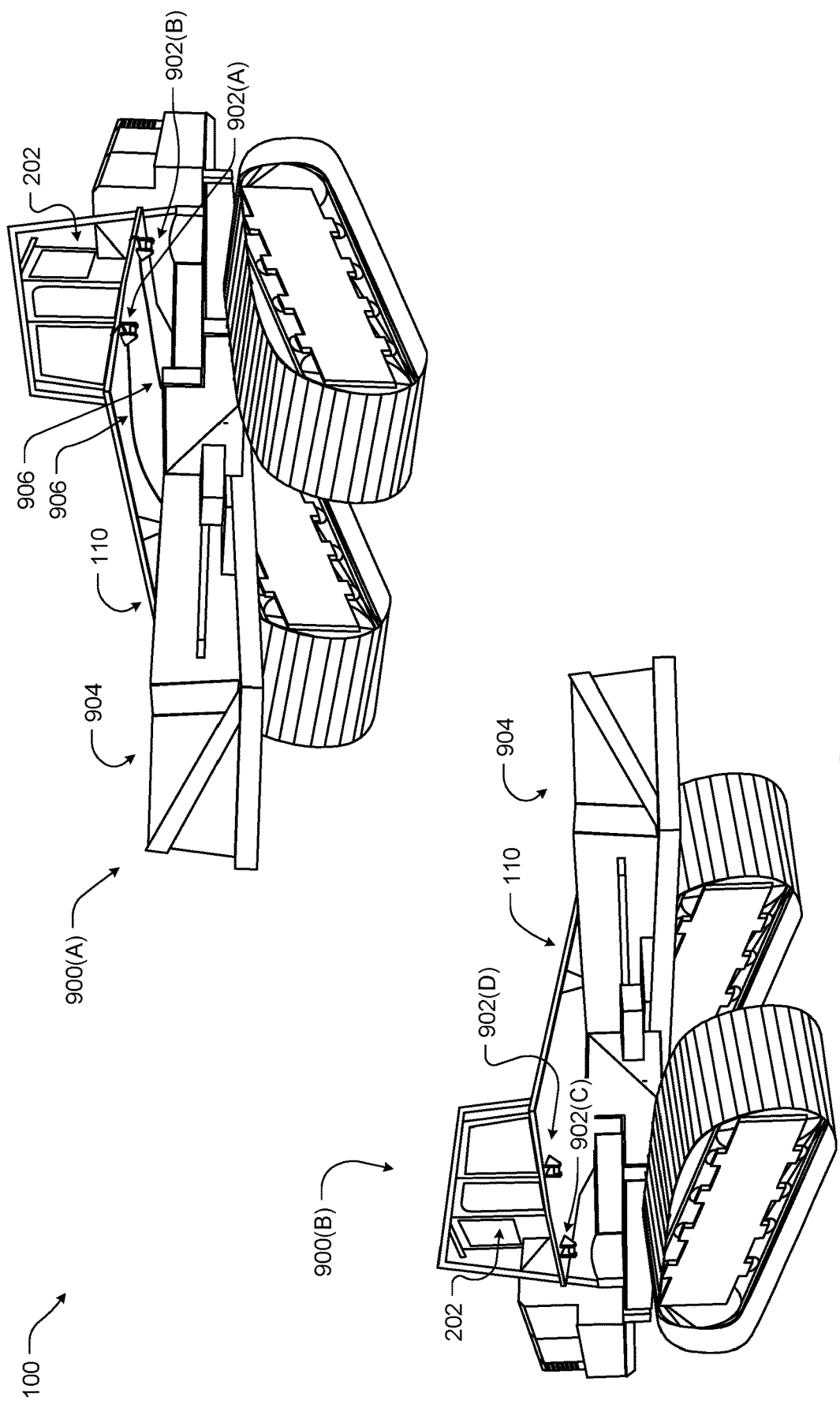
FIG. 9 illustrates example left and right side perspective views of the vehicle 100 with the platform 110 raised and tilted in opposing directions according to some implementations.

FIG. 9 illustrates example left and right side perspective views of the vehicle 100 with the platform 110 raised and tilted in opposing directions according to some implementations. In the example 900(A), the platform 110 is raised and tilted to the right with respect to the cab 202. As shown, a first set of coupling mechanisms 902(A) and 902(B) may be attached to the bottom of the platform 110 to assist with securing a load to the platform 110. Likewise, in the example 900(B), the platform 110 is raised and tilted to the left with respect to the cab 202. As shown, a second set of coupling mechanisms 902(C) and 902(D) may be attached to the bottom of the platform 110 to assist with securing a load to the platform 110 via one or more cables 906. In the illustrated example, the coupling mechanisms 902(A)-(D) are shown as loop holes but it should be understood that other type of securing mechanisms may be used, including but not limited to clasps, hooks, clasps, cabling, flexible members, pulleys, among others. Additionally, in other examples, the platform 110 may be equipped with between 1 and 10 coupling mechanisms per side and the location of the coupling mechanisms 902 may vary. For example, the coupling mechanisms 902 may be located along the top surface of the platform 110 or proximate to the front and back sides of the platform 902.

The vehicle 100 may also include a balancing member 904 that extends outward from the vehicle 100 opposite the cab 202. For example, the balancing member 904 may act to equalize the weight distribution of the vehicle 100 such that the vehicle 100 does not tip during transportation. In some cases, the weight of the balancing member 904 may be proportional or equal to the weight of the cab 202 (or the cab 202 and engine).

Figure 10:
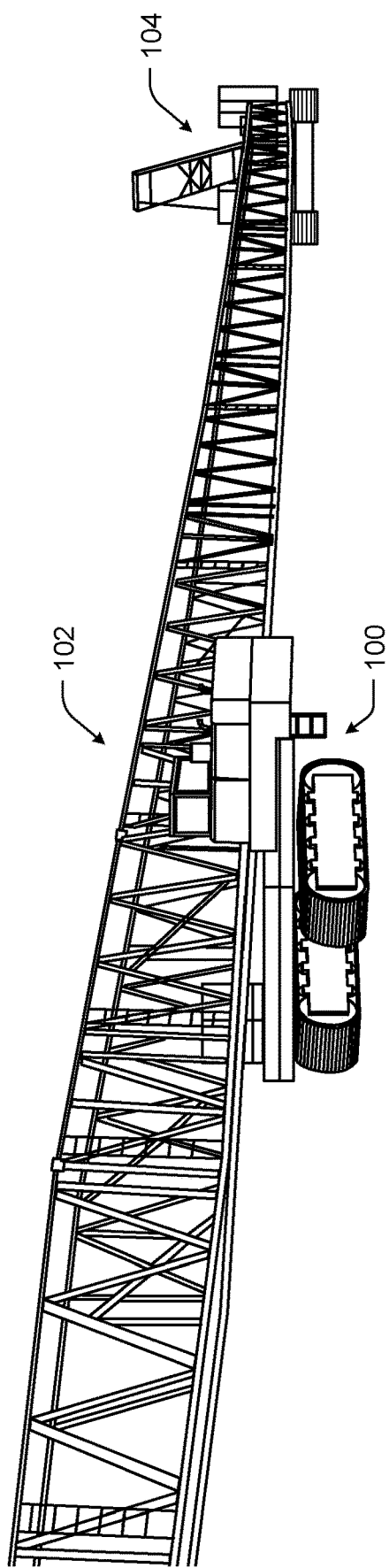
FIG. 10 illustrates an example vehicle of FIG. 1 in the process of transporting a boom arm of a crane according to some implementations.
Figure 11:
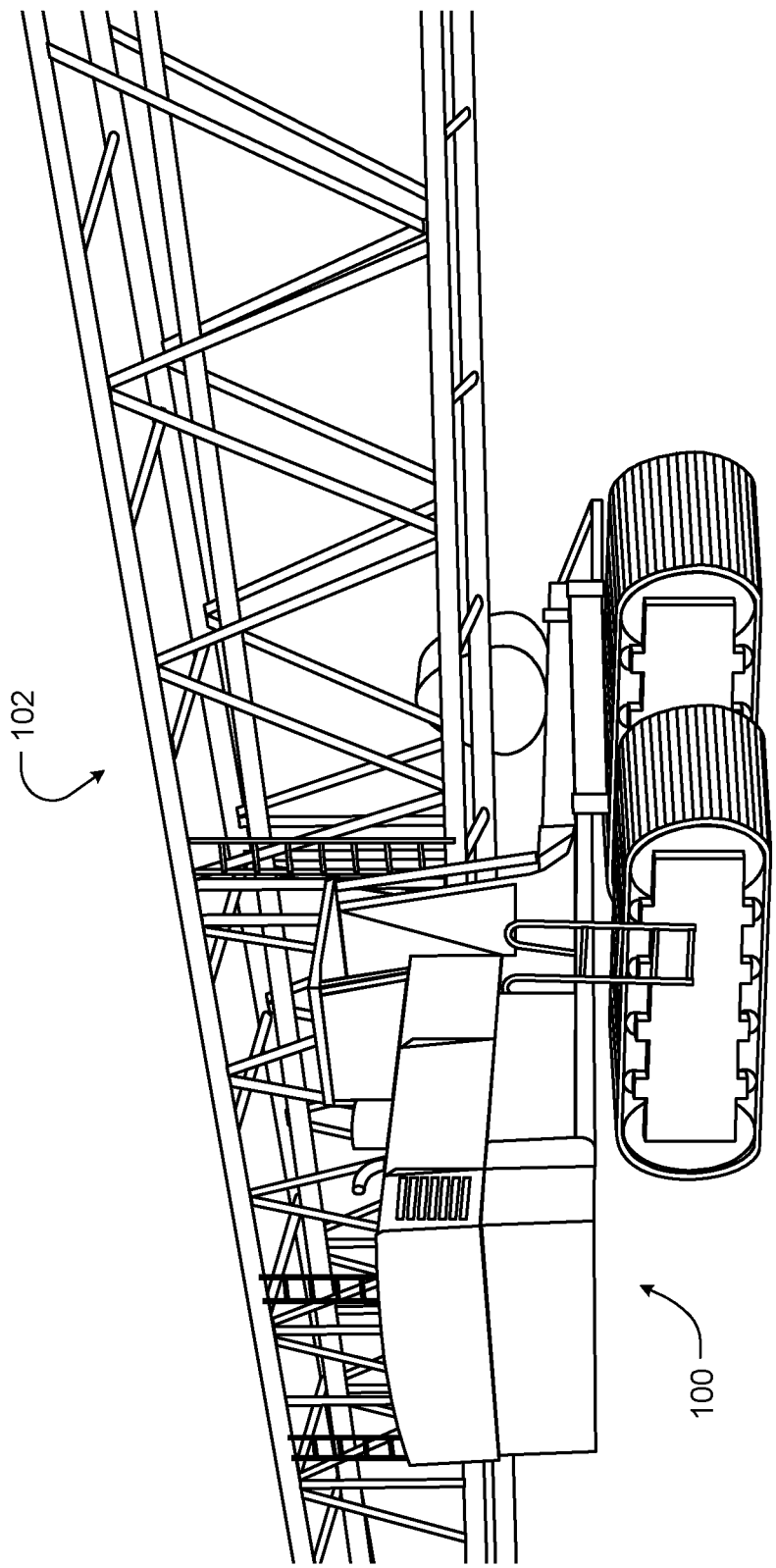
FIG. 11 illustrates another example vehicle of FIG. 1 in the process of transporting a boom arm of a crane according to some implementations.
Figure 12:
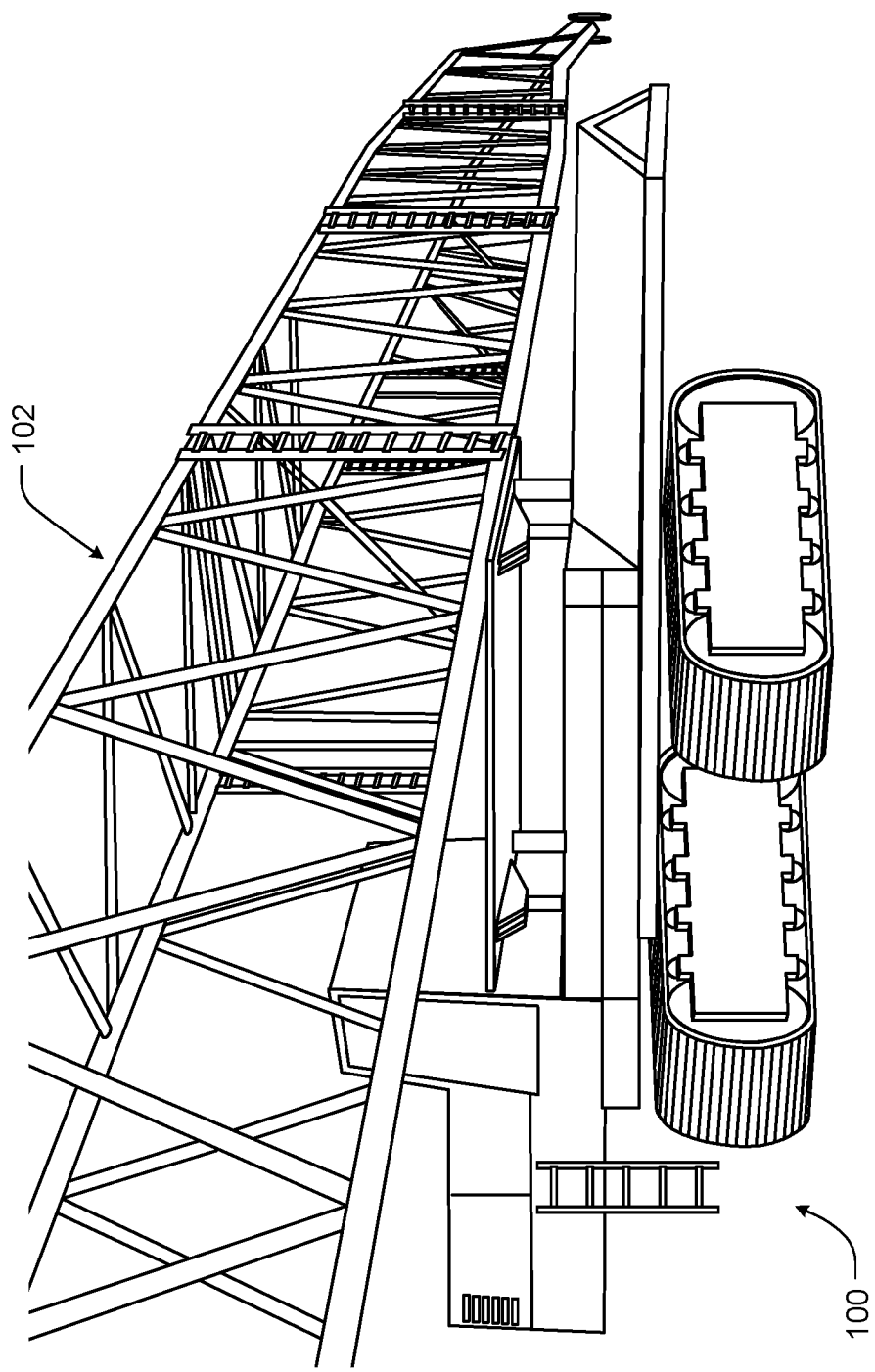
FIG. 12 illustrates yet another example vehicle of FIG. 1 in the process of transporting a boom arm of a crane according to some implementations.

FIGS. 10-12 illustrate example views of the vehicle 100 in the process of transporting a boom arm of a crane according to some implementations. As discussed above, in some cases, the vehicle 100 may assist a crane 104 with a drivable base member in moving the boom arm without requiring the boom arm to be detached from the crane 104. In these cases, a single vehicle 100 may be positioned opposite the crane 104 to support the top end of the boom arm 102 during transport.

Figure 13:
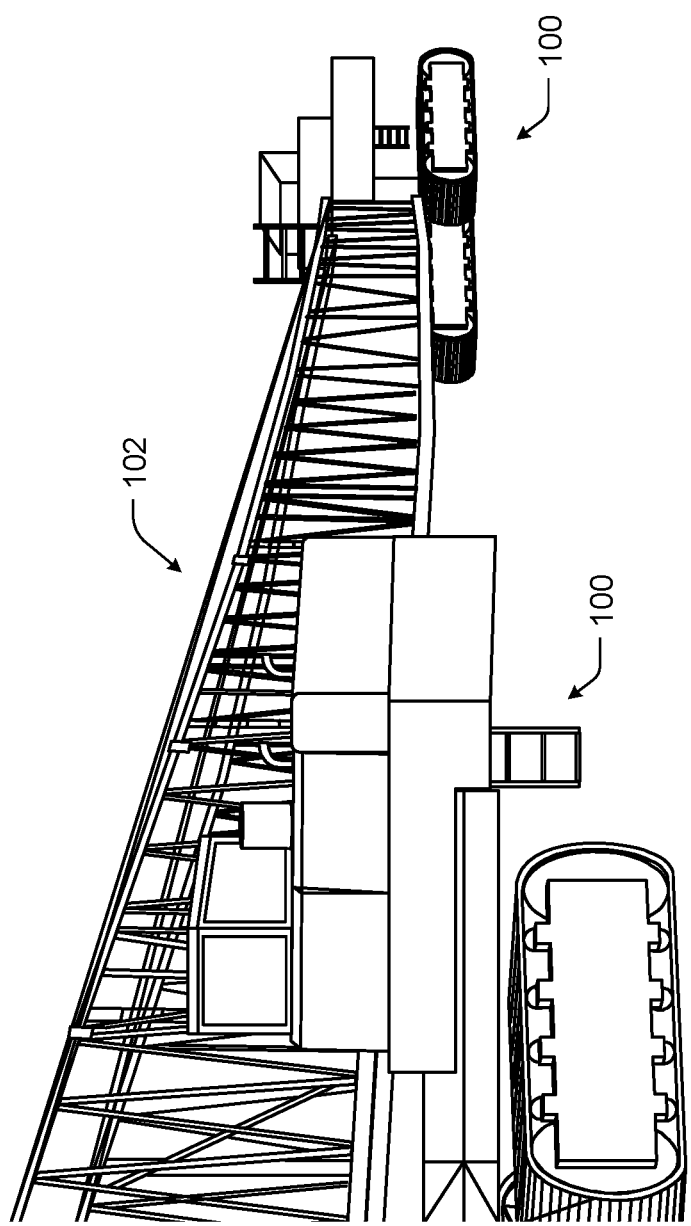
FIG. 13 illustrates an example of a pair of vehicles shown in FIG. 1 in the process of transporting a boom arm of a crane according to some implementations.

FIG. 13 illustrates an example of a pair of vehicles 100 in the process of transporting a boom arm 102 of a crane according to some implementations. In some cases, the base of the crane may not be self-drivable or the boom arm 102 may be long enough to require additional support (such as in the middle). In these cases, a second vehicle 100 may be positioned to support the base of the boom arm 102 in lieu of the crane. In one specific example, each of the vehicles 100 transporting the boom arm 102 may be in wireless communication with each other such that each vehicle 100 may move in sync with the other while the move is in progress.

Figure 14:
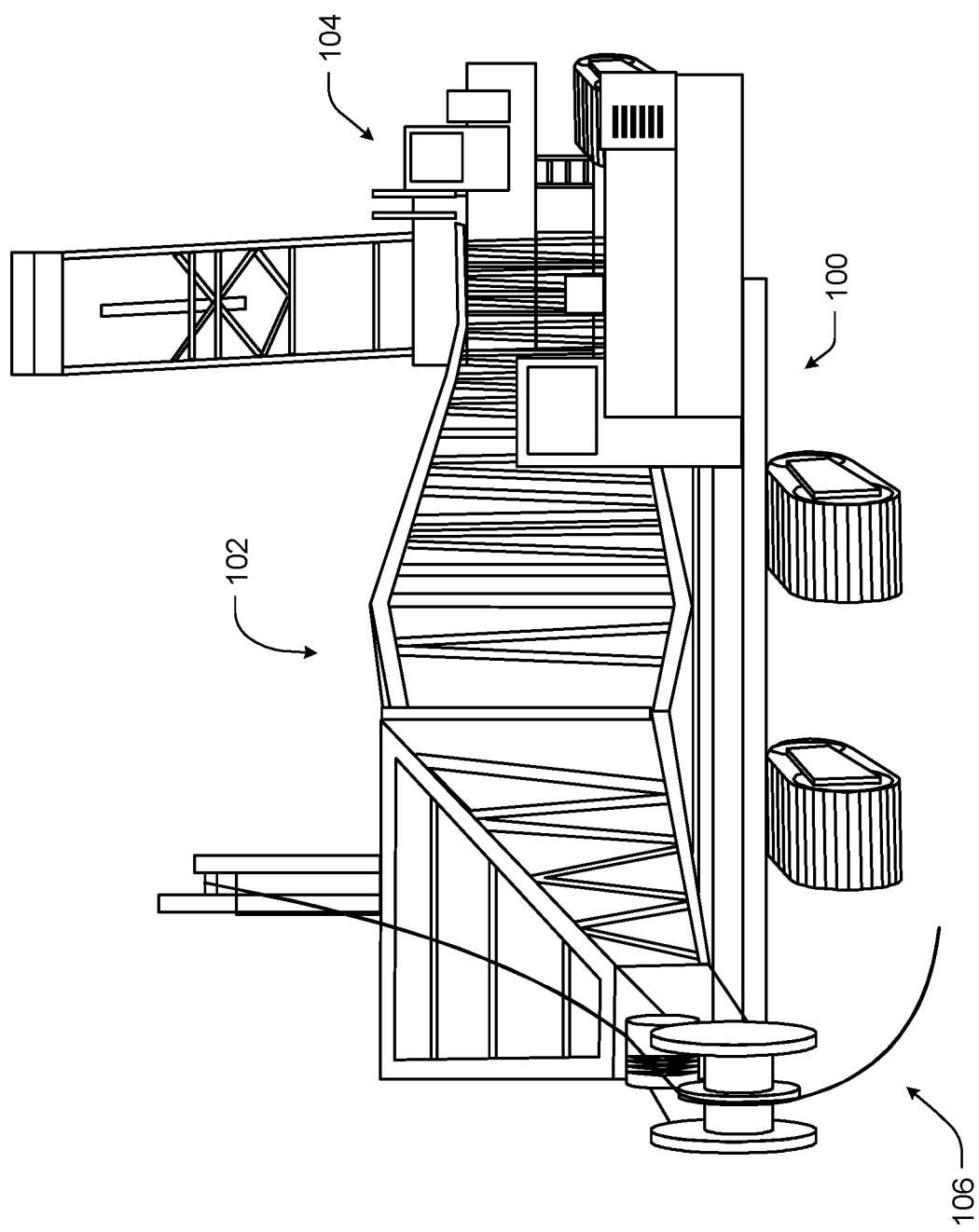
FIG. 14 illustrates yet another example vehicle of FIG. 1 in the process of transporting a boom arm of a crane according to some implementations.

FIG. 14 illustrates yet another example vehicle of FIG. 1 in the process of transporting a boom arm 102 of a crane 104 according to some implementations. In the current example, the cabling 106 has been loosened to allow the boom arm 102 to be lowered from the upright or vertical position.

Figure 15:
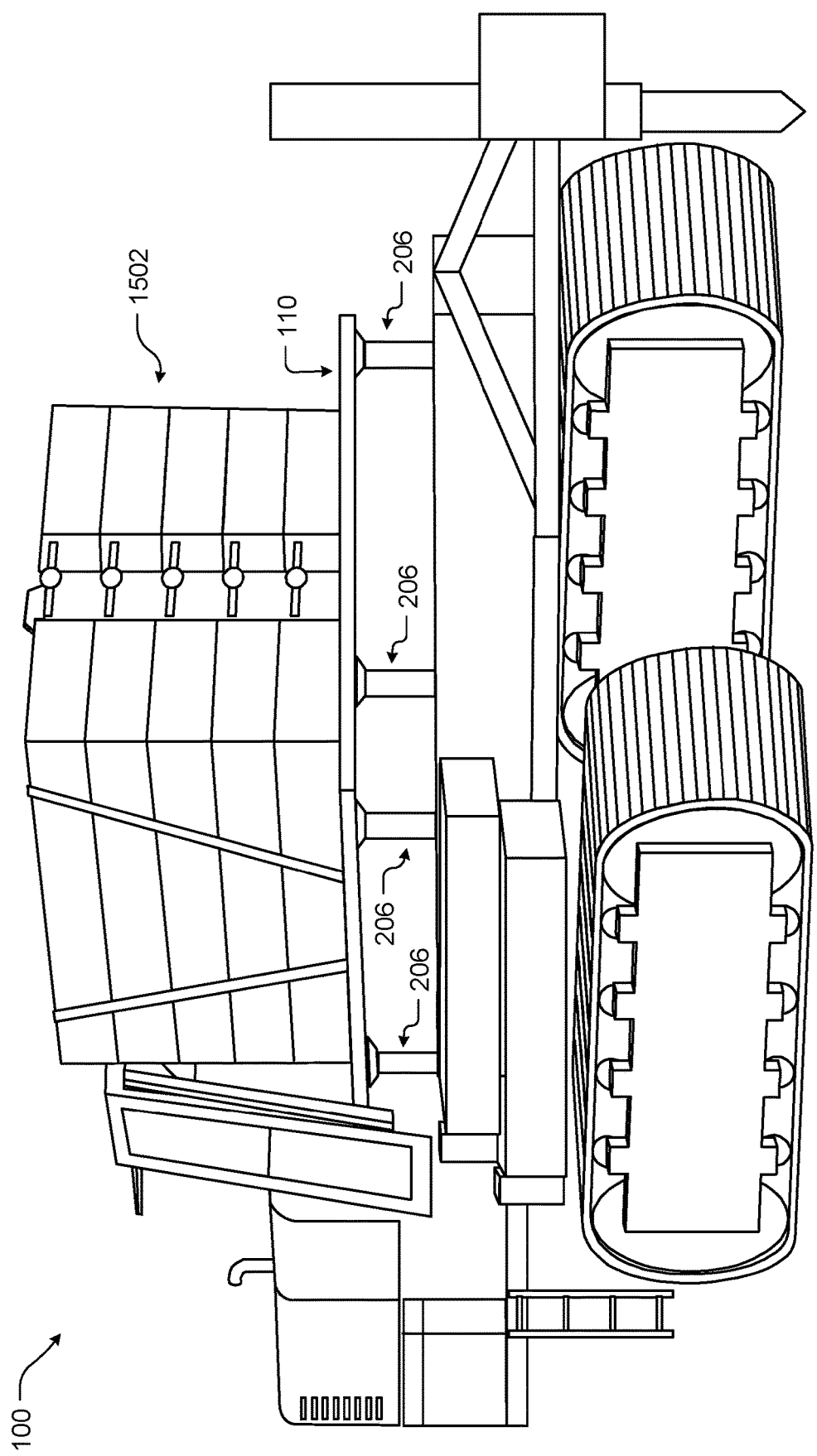
FIG. 15 illustrates an example vehicle shown in FIG. 1 in the process of transporting a counter weights of a crane according to some implementations.

FIG. 15 illustrates an example vehicle 100 shown in FIG. 1 in the process of transporting a counter weights 1502 of a crane according to some implementations. It should be understood, and as illustrated, the vehicle 100 may be configured to transport loads other than the boom arm of the crane, as discussed above with respect to FIGS. 1-14. In this example, as the boom arm is being raised, the vehicle 100 may be used to pick up and transport the counter weights 1502.

In the illustrated implementation, the hydraulic lift system includes four hydraulic cylinders 206 that may be used to lift, tilt and pitch the platform 110. In some cases, each of the hydraulic cylinders 206 may be raised or lowered independently to increase the flexibility with respect to the angle of the top surface of the platform 110.

Figure 16:
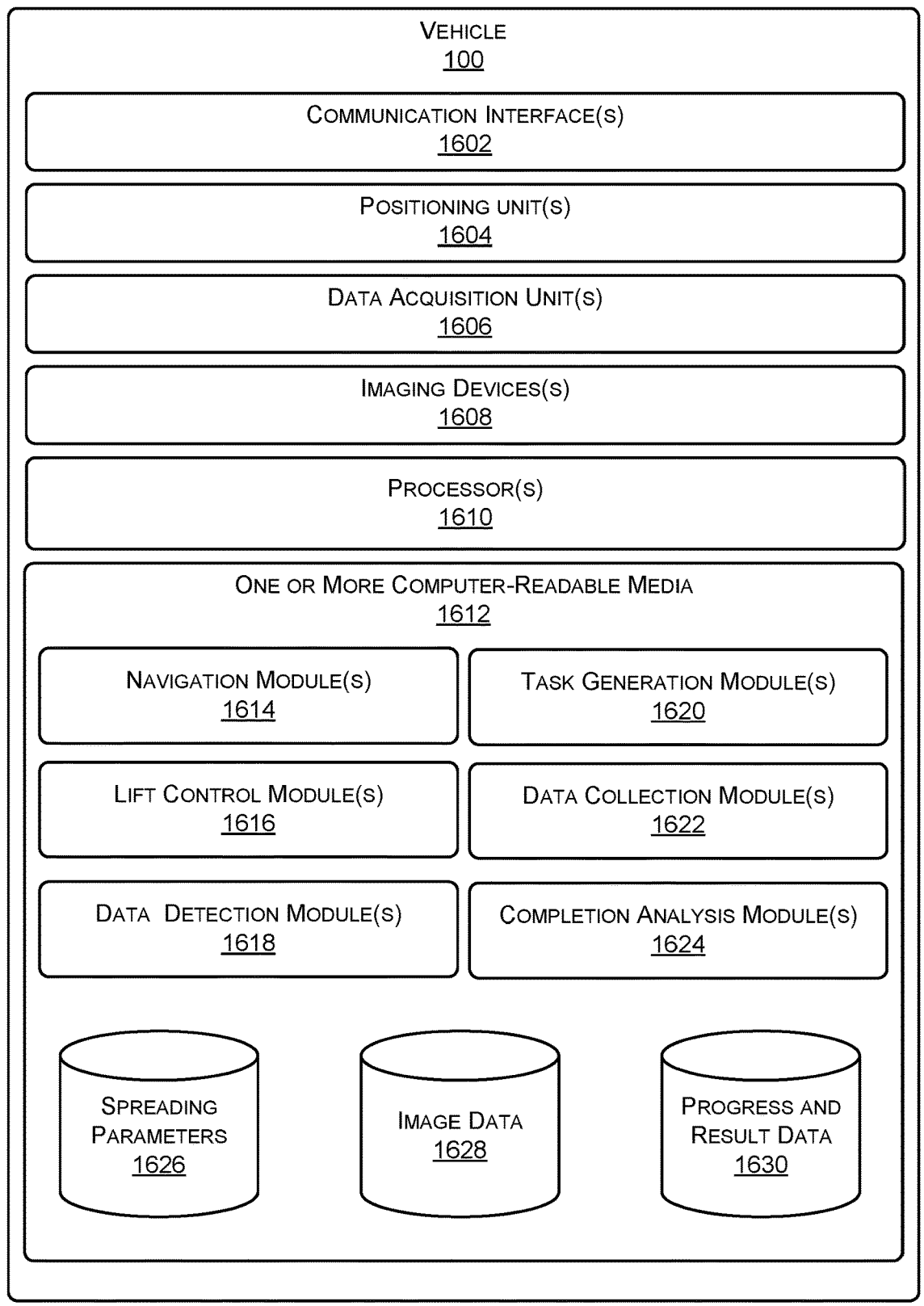
FIG. 16 illustrates example components of a control system of the vehicle of FIG. 1 according to some implementations.

FIG. 16 illustrates example components of a control system of the vehicle 100 of FIG. 1 according to some implementations. In the illustrated example, the vehicle 100 and/or vehicle control unit may be coupled to or include one or more communication interfaces 1602, one or more positioning units 1604, and one or more data acquisition units 1606 (e.g., sensors, accelerometers, gyroscopes, IMUs, etc.) and one or more imaging devices 1608 for collecting data usable for assisted or autonomous control of the vehicle 100 or platform 110 and/or monitoring of terrain.

The communication interfaces 1602 may support both wired and wireless connection to various networks, such as cellular networks, radio networks (e.g., radio-frequency identification (RFID)), WiFi networks, short-range or near-field networks (e.g., Bluetooth®), infrared signals, local area networks, wide area networks, the Internet, and so forth. For example, the communication interfaces 1602 may allow the vehicle 1600 to receive data, such as terrain or elevation data, from a cloud-based or other remote system, such as an electronic device or sensors associated with the crane or section vehicle 100.

The positioning units 1604 may include one or more sensor package combinations including GNSS sensors. In some cases, the positioning units 1604 may be disposed on the top of the vehicle body and include one or more antennas for receiving satellite signals and one or more receivers or other components for decoding the satellite signals and determining a global position of the positioning units 1604. In some cases, the satellite signals received by a GNSS sensor may be in various formats or standards, such as GPS, GLONASS, Galileo, BeiDou as well as other satellite navigation standards.

In some cases, the data acquisition units 1606 may include one or more accelerometers, one or more gyroscopes, one or more magnetometers, and/or one or more pressure sensors, among other sensors. In one particular example, the data acquisition units 1606 may include an IMU sensor or package. For instance, an IMU sensor or package may include three accelerometers placed orthogonally to each other, three rate gyroscopes placed orthogonally to each other, three magnetometers placed orthogonally to each other, and a barometric pressure sensor. In general, the data acquisition units 1606 are configured to collect data associated with the movement, tilt, pitch, yaw, and acceleration of the vehicle and conditions of the terrain during operations.

The imaging units 1608 may include one or more cameras or other image components usable to collect data associated with the surrounding environment. For example, vehicle 1600 may be equipped with stereo vision and/or LiDAR vision systems for capturing environment data as well as unexpected obstacles.

The vehicle 100 may also include processing resources, as represented by processors 1610, and computer-readable storage media 1612. The computer-readable storage media 1612 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Several modules such as instructions, data stores, and so forth may be stored within the computer-readable media 1612 and configured to execute on the processors 1610. For example, a navigation module 1614 to assist with report or autonomous operations, lift control module 1616 to control the height and position of the platform, and a data processing module 1618 to receive and process the data collected by various data acquisition units 1606 and/or imaging units 1608 and to, based on the processed data, generate at least on control signal for a lift control system 1616. In some implementations, the computer-readable media 1612 may store data captured by the vehicle 100 and/or parameters (such as thresholds) associated with transporting a load.

Figure 17:
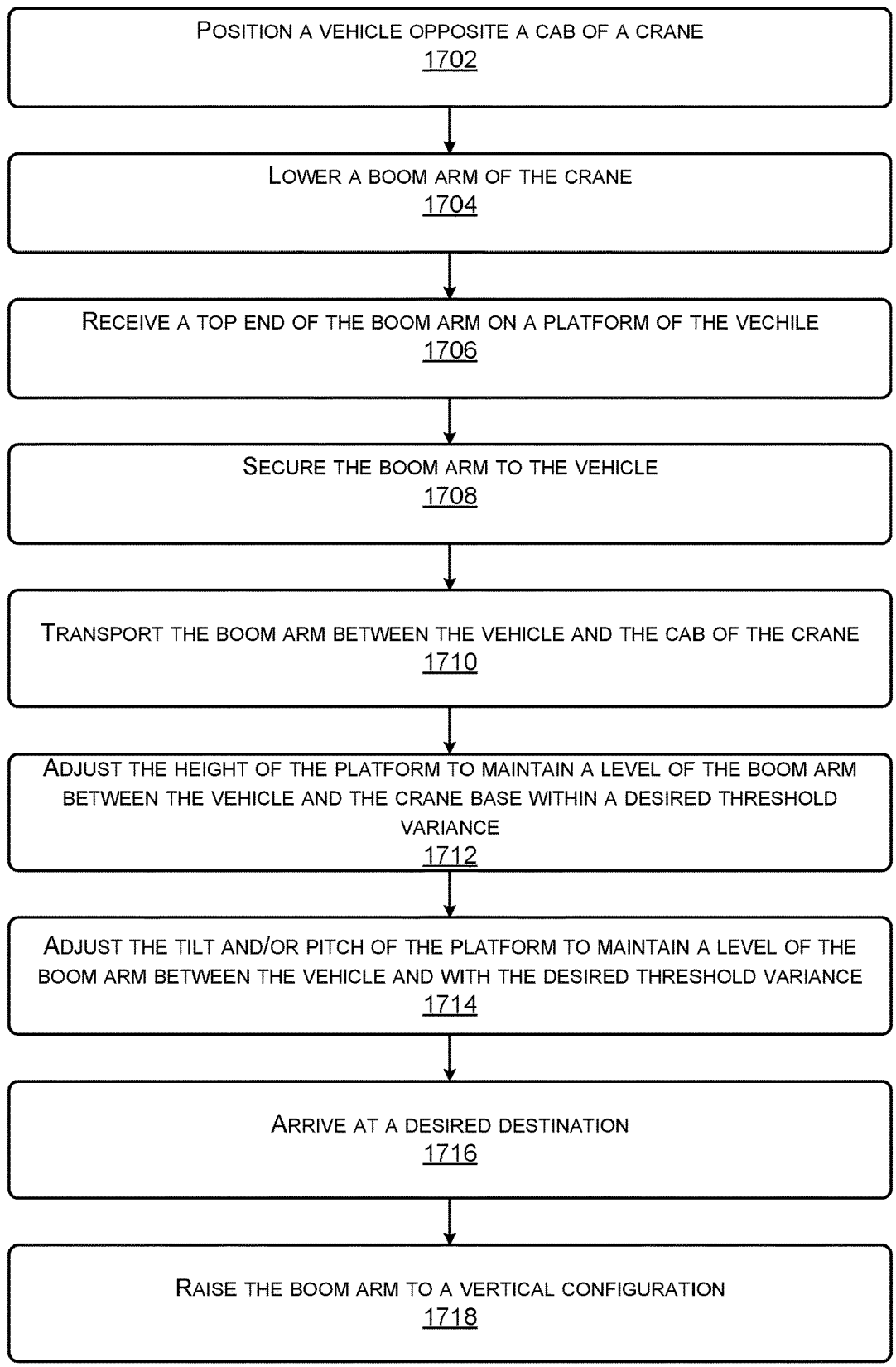
FIG. 17 is a flow diagram illustrating example processes associated with transporting a boom arm of a crane according to some implementations.

FIG. 17 is a flow diagram illustrating example processes associated with transporting a boom arm of a crane according to some implementations. The processes are illustrated as a collection of blocks in a logical flow diagram, which represent a sequence of operations. The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

At 1702, an operator may position a vehicle, such as vehicle 100 of FIGS. 1-16, opposite a cab of a crane. For example, the vehicle may be driven to a position approximately at which a top end of a boom arm of the crane will occupy when the cabling is loosened and the boom arm is lowered.

At 1704, the boom arm of the crane is lowered. For example, the cabling supporting the boom arm in the vertical positioned may be loosened to cause the boom arm to lower toward the ground and the waiting vehicle.

At 1706, the vehicle may receive a top end of the boom arm on a platform. For example, an operator may adjust the position, tilt, pitch, and height of the platform as the boom arm is lowered, such that a portion of the boom arm proximate to the top end rests on the platform when fully lowered. In some cases, the operator may adjust the position, tilt, pitch, and height of the platform to cause the boom arm to be within a threshold horizontal level with respect to the crane base. For instance, the level may be maintained within a 15 degree plus or minus of the horizontal level.

At 1708, the boom arm is secured to the vehicle. For example, cabling may be attached between coupling mechanism positioned on the right and left side of the platform. The cabling may stabilize and secure the boom arm during transport.

At 1710, the vehicle together with the crane base (or another vehicle) may transport the boom arm. In some cases, such as when servicing windmills, the boom arm may pass under as many as 10 to 15 electrical lines during a transport within a single site. By transporting the boom arm in a horizontal position between the crane base and the vehicle, the crane can be moved without completely disassembling the crane, saving days or time.

At 1712, the vehicle or vehicle operator may adjust the height of the platform to maintain a level of the boom arm between the vehicle and crane within a desired horizontal threshold, such as 15 degrees plus or minus from horizontal. For instance, in some cases, the terrain may not be level and, thus, the orientation and height of the platform may be adjusted to prevent undue strain on the boom arm caused by changes in the terrain.

At 1714, the vehicle or vehicle operator may adjust the tilt and/or pitch of the platform to maintain a level of the boom arm between the vehicle and crane within a desired horizontal threshold, such as 15 degrees plus or minus from horizontal. As discussed above, in some cases, the terrain may not be level and, thus, the orientation and height of the platform may be adjusted to prevent undue strain on the boom arm caused by changes in the terrain.

At 1716, the vehicle and crane may arrive at a desired destination and, at 1718, the boom arm may be raised back to a vertical configuration or position. When the boom arm is raised, the crane may continue normal operation, such as servicing the windmills.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A vehicle comprising:
   a wheel system;
   a substantially planar platform positioned over the wheel system, the platform configured to releasably couple to a boom arm of a crane;
   a hydraulic lift system coupled to the platform above the wheel system, the hydraulic lift system to cause the platform to raise and lower independently from and with respect to the wheel system; and
   wherein the substantially planar platform is configured to rotate 360 degrees about a point below the substantially planar platform, the point is a center point of the platform, and the platform is maintained over the wheel system for each degree of rotation.

2. The vehicle as recited in claim 1, further comprising:
   a cab for allowing an operator to control the vehicle, the cab positioned horizontally adjacent to the platform; and
   wherein the cab is configured to rotate 360 degrees about the point below the substantially planar platform.

3. The vehicle as recited in claim 1, wherein the hydraulic lift system is also configured to cause the platform to tilt or pitch.

4. The vehicle as recited in claim 1, further comprising at least one of a sensor or an image device to collect data associated with terrain proximate to the vehicle.

5. The vehicle as recited in claim 4, further comprising a control unit to process the data associated with the terrain and, in response to processing the data, to send at least one control signal to cause the hydraulic lift system to adjust a position of the platform.

6. The vehicle as recited in claim 1, further comprising at least one coupling mechanisms permanently affixed to an exterior of the substantially planar platform.

7. The vehicle as recited in claim 1, wherein wheel system is a tread-based system formed from steel or rubber.

8. The vehicle as recited in claim 1, wherein the platform is coupled to the hydraulic lift system via a tilt mechanism to allow the substantially planar platform to tilt.

9. The vehicle as recited in claim 1, wherein the substantially planar platform is approximately 12 feet wide and approximately 12 feet long.

10. A vehicle comprising:
    a tread based steering system;
    a base member coupled to the tread based steering system;
    a swing bearing coupled to a top surface of the base member, the swing bearing to horizontally rotate a position of the planar platform with respect to the tread based steering system;
    a planar platform couple to the base member;
    at least one hydraulic cylinder coupled between the planar platform and the base member to vertically adjusted a position of the planar platform with respect to the tread based steering system, the at least one hydraulic cylinder coupled to the planar platform to maintain a center portion of the planar platform over the tread based steering system over a length of the vertical adjustment of the at least one hydraulic cylinder and over a full rotation of the horizontal rotation of the swing bearing; and
    a cab for allowing an operator to control the vehicle positioned adjacent to the planar platform and coupled to the base member, such that the swing bearing may rotate the cab and the planar platform in unison.

11. The vehicle as recited in claim 10, wherein the planar platform is coupled to the hydraulic cylinder via a tilt mechanism to allow the planar platform to tilt from side to side.

12. The vehicle as recited in claim 11, wherein the planar platform is coupled to the hydraulic cylinder via a tilt mechanism also allows the planar platform to pitch forward and backward.

13. The vehicle as recited in claim 10, wherein the platform is configured to support between 50,000 and 150,000 pounds.

14. The vehicle as recited in claim 10, wherein the base member extends outward past a front end of the treads in a direction opposite of the cab.

15. The vehicle as recited in claim 10, further comprising a first set of coupling mechanisms attached to a bottom surface of the planar platform along a first side of the planar platform and a second set of coupling mechanisms attached to the bottom surface of the planar platform along a second side of the platform, the second side opposite the first side of the planar platform.

16. The vehicle as recited in claim 15, further comprising cabling to secure a load between the first set of coupling mechanisms and the second set of coupling mechanisms.

17. The vehicle as recited in claim 10, further comprising at least one of a sensor or an image device to collect data associated with terrain proximate to the vehicle and a second cab of a crane, wherein a top end of a boom arm of the crane is releasably coupled to the planar platform.

18. The vehicle as recited in claim 17, further comprising a control unit to process the data associated with the terrain and, in response to processing the data, to send at least one control signal to cause the hydraulic cylinder to adjust a position of the planar platform to maintain a height of the planar platform with respect to the second cab of the crane.

19. The vehicle as recited in claim 10, further comprising:
    at least one inertial measurement (IMU) unit to collect IMU data associated with terrain proximate to the vehicle; and
    in response to processing the IMU data and one or more height thresholds, to send at least one control signal to cause the hydraulic cylinder to adjust a position of the planar platform to maintain a height of the planar platform with respect to the one or more thresholds.

20. The vehicle as recited in claim 2, wherein the hydraulic lift system causes the platform to raise and lower independently from the cab.

* * * * *